United States Patent
Chang et al.

(10) Patent No.: US 11,950,167 B2
(45) Date of Patent: Apr. 2, 2024

(54) LOCATION DATA TRANSMISSION SCHEDULING FOR A MOBILE COMPUTING DEVICE

(71) Applicant: Uber Technologies, Inc., San Francisco, CA (US)

(72) Inventors: Erick Chang, San Francisco, CA (US); Katherine Swanson, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 68 days.

(21) Appl. No.: 17/348,475

(22) Filed: Jun. 15, 2021

(65) Prior Publication Data

US 2021/0314736 A1 Oct. 7, 2021

Related U.S. Application Data

(63) Continuation of application No. 15/959,861, filed on Apr. 23, 2018, now Pat. No. 11,039,277.

(51) Int. Cl.
H04W 4/029 (2018.01)
H04L 43/0811 (2022.01)
H04W 52/02 (2009.01)

(52) U.S. Cl.
CPC ....... *H04W 4/029* (2018.02); *H04W 52/0261* (2013.01); *H04L 43/0811* (2013.01)

(58) Field of Classification Search
CPC .............. H04W 4/029; H04W 52/0261; H04L 43/0811
See application file for complete search history.

(56) References Cited

U.S. PATENT DOCUMENTS

| 7,239,896 B1 * | 7/2007 | Hill ..................... H04B 1/1615 |
| | | 455/343.1 |
| 9,247,410 B1 | 1/2016 | Matsuo |

(Continued)

FOREIGN PATENT DOCUMENTS

| CN | 105933521 | 9/2016 |
| EP | 2730106 | 5/2014 |

(Continued)

OTHER PUBLICATIONS

Canadian Office Action in Application 3069854, dated Jan. 26, 2021, 7 pages.

(Continued)

*Primary Examiner* — Charles N Appiah
*Assistant Examiner* — Nicole M Louis-Fils
(74) *Attorney, Agent, or Firm* — Dority & Manning, P.A.

(57) ABSTRACT

A mobile computing device can operate as a user device or a service provider device for a network-based service. The mobile computing device can transmit location data to a network system to aid in the network system's management of the network-based service. The mobile computing device can dynamically adjust the location data transmission rate at which location data is transmitted to the network system based on various parameters, including one or more of: a power status, information related to the network-based service, network connectivity metrics, and the like. By dynamically adjusting the location data transmission rate based one or more of these parameters, the mobile computing device can conserve battery power without adversely affecting the provisioning of the network-based service.

17 Claims, 5 Drawing Sheets

(56) References Cited

U.S. PATENT DOCUMENTS

| | | |
|---|---|---|
| 9,980,230 B1 * | 5/2018 | Singh .................. H04W 4/90 |
| 11,039,277 B2 | 6/2021 | Chang |
| 2005/0101333 A1 | 5/2005 | Raith |
| 2005/0215230 A1 | 9/2005 | Cheng |
| 2006/0119508 A1 | 6/2006 | Miller |
| 2006/0211430 A1 | 9/2006 | Persico |
| 2006/0258371 A1 | 11/2006 | Krishnamurthi |
| 2010/0283600 A1 * | 11/2010 | Herbert ............ G08B 21/0252 340/539.1 |
| 2010/0323715 A1 | 12/2010 | Winters |
| 2011/0050503 A1 | 3/2011 | Fong |
| 2011/0128144 A1 | 6/2011 | Baron, Sr. |
| 2013/0102268 A1 | 4/2013 | Wang |
| 2013/0314278 A1 | 11/2013 | Lim |
| 2013/0332056 A1 | 12/2013 | Huang |
| 2014/0214314 A1 | 7/2014 | Segev |
| 2014/0370909 A1 | 12/2014 | Natucci, Jr. et al. |
| 2015/0065118 A1 | 3/2015 | Davies |
| 2015/0073702 A1 | 3/2015 | Jouaux |
| 2015/0256277 A1 | 9/2015 | Johnson |
| 2015/0281904 A1 | 10/2015 | Vaccari |
| 2015/0304436 A1 | 10/2015 | Vaccari |
| 2016/0169692 A1 | 6/2016 | Gupta |
| 2016/0277897 A1 | 9/2016 | Wu et al. |
| 2016/0286355 A1 | 9/2016 | Shur |
| 2016/0286501 A1 | 9/2016 | Taite |
| 2016/0323818 A1 | 11/2016 | Senarath |
| 2017/0094599 A1 | 3/2017 | Eskelinen |
| 2017/0168555 A1 | 6/2017 | Munoz |
| 2017/0180963 A1 | 6/2017 | Cavendish |
| 2017/0193443 A1 * | 7/2017 | Barcala ............ G06Q 10/0833 |
| 2017/0295582 A1 * | 10/2017 | Gurney ............ H04W 72/542 |
| 2019/0327580 A1 | 10/2019 | Chang |

FOREIGN PATENT DOCUMENTS

| | | | |
|---|---|---|---|
| EP | 2830299 | 1/2015 | |
| EP | 3190835 | 7/2017 | |
| JP | 2005333547 A | 12/2005 | |
| JP | 2012181087 A | 9/2012 | |
| JP | 2015025810 A | 2/2015 | |
| JP | 2016066908 | 4/2016 | |
| WO | WO 2011/022412 | 2/2011 | |
| WO | WO-2014014800 A1 * | 1/2014 | ........... G06F 1/3203 |
| WO | WO 2014/118529 | 8/2014 | |
| WO | 2016/193830 | 12/2016 | |

OTHER PUBLICATIONS

PCT International Preliminary Report on Patentability in PCT/US2019/028789 dated Aug. 14, 2020, 20 pages.

PCT International Search Report and Written Opinion in PCT/US2019/028789 dated Aug. 1, 2019, 10 pages.

U.S. Appl. No. 15/959,861, Notice of Allowance dated Feb. 16, 2021, 11 pages.

U.S. Appl. No. 15/959,861, Office Action dated Feb. 13, 2019, 16 pages.

U.S. Appl. No. 15/959,861, Office Action dated Feb. 7, 2020, 21 pages.

U.S. Appl. No. 15/959,861, Office Action dated Jul. 23, 2019, 21 pages.

U.S. Appl. No. 15/959,861, Office Action dated Jul. 23, 2020, 21 pages.

U.S. Appl. No. 15/959,861, Office Action dated Sep. 6, 2018, 17 pages.

Extended European Search Report for Application No. EP19792826.0, dated Dec. 3, 2021, 10 pages.

\* cited by examiner

LOCATION DATA TRANSMISSION SCHEDULING FOR A MOBILE COMPUTING DEVICE

CROSS-REFERENCE TO RELATED APPLICATIONS

This application is a continuation application of U.S. patent application Ser. No. 15/959,861, filed on Apr. 23, 2018 (now U.S. Pat. No. 11,039,277), the entire disclosure of which is hereby incorporated herein by reference.

BACKGROUND

A network-based service can enable users to request and receive various services through applications on mobile computing devices. The network-based service can match a service provider with a requesting user based on the current location of the service provider and a service location specified by the requesting user or determined based on the current location of the requesting user.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
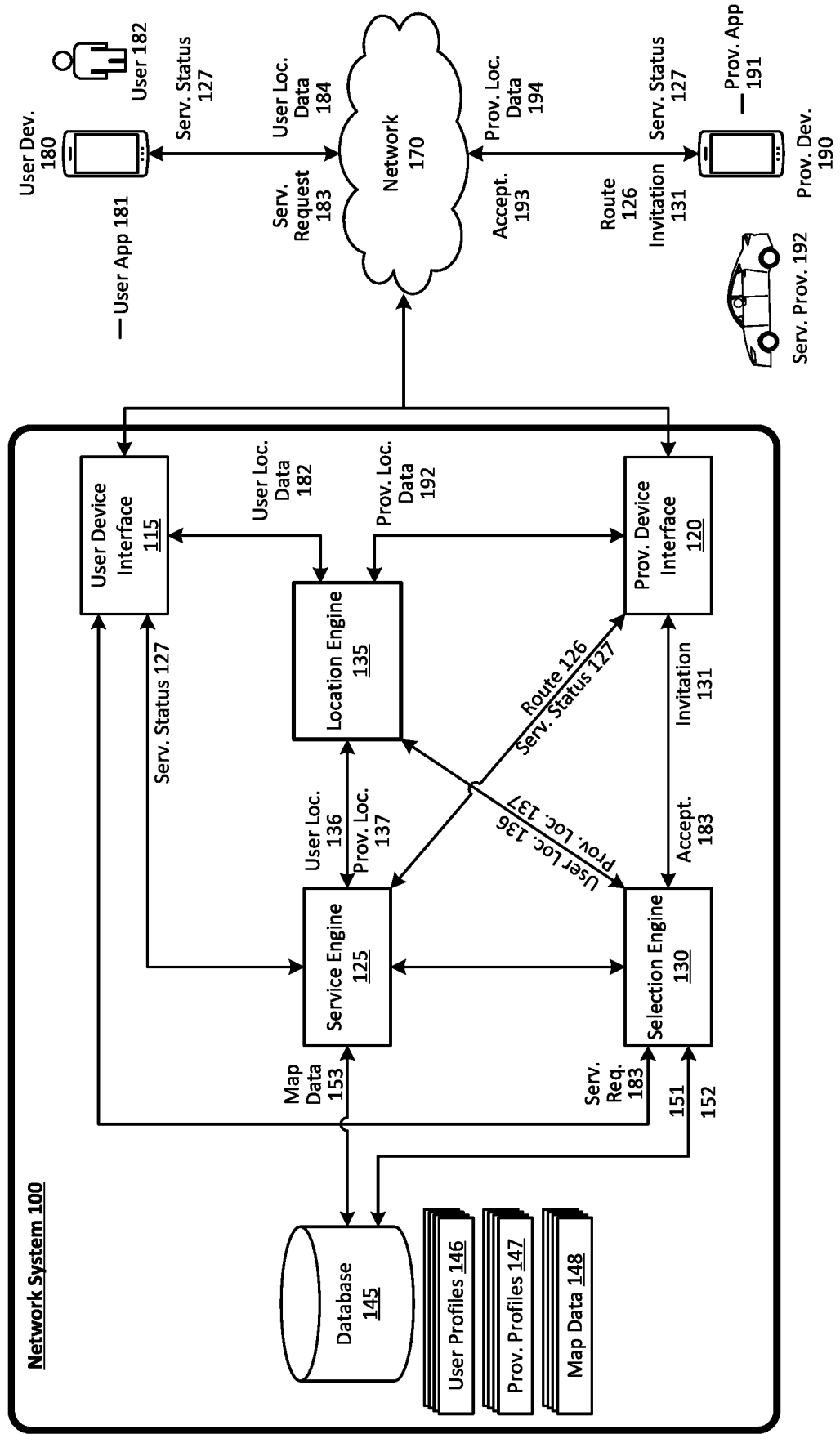
FIG. 1 is a block diagram illustrating an example network system managing a network-based service, in accordance with examples described herein.

Examples described herein provide for a mobile computing device that can transmit location data (e.g., a current location, location history, etc.) over one or more networks (e.g., a cellular data network, a Wi-Fi network, etc.) to a network system that manages a network-based service over a given geographic region (e.g., San Francisco, New York City, etc.). Examples of the network-based service can include an on-demand transport service, a delivery service, a courier service, etc. The mobile computing device can be a user device operated by a user requesting the network-based service or a provider device operated by a service provider that can fulfill service request. To manage the network-based service, the network system can communicate with a plurality of mobile computing devices, including provider devices and user devices, over one or more networks to link available service providers (e.g., drivers, couriers, and/or autonomous vehicles (AVs)) with requesting users (e.g., riders, service requesters, etc.) throughout the service region (e.g., the given geographic region in which the network service is managed by the network system). The provider device and the user device can execute respective applications (e.g., a provider application, a user application) to facilitate the network-based service by, for example, transmitting requests for service to the network system, accepting invitations to provide the requested service, displaying information relating to the network-based service, and the like.

In various aspects, the user devices and provider devices can be configured to generate location data and transmit their respective location data to the network system. The location data can be generated by location-aware resources of the user devices and the provider devices. For instance, a mobile computing device (e.g., a user device or a provider device) can include a Global Positioning System (GPS) receiver or other location-aware resources (e.g., GLONASS receiver, Galileo receiver, or BeiDou receiver, etc.) that can generate data indicating the precise geographical location of the mobile computing device. The mobile computing device can also generate location data using its communication interfaces (e.g., via cellular, Wi-Fi, or Bluetooth connections). The transmission of location data from user devices and provider devices can enable the network system to determine locations of users and service providers in order to manage the network service. For example, based on location data transmitted by a user device, the network system can determine a start location of a request for on-demand transport service or a delivery location of a request for a delivery service. Similarly, based on location data transmitted by a provider device, the network system can determine whether to select the service provider (e.g., based on proximity of the service provider's location to the start location) to service the request for the network-based service.

According to embodiments, a mobile computing device (e.g., a user device or a provider device) can periodically transmit location data to the network system in accordance with one or more location data transmission rates. In certain implementations, the provider and/or user applications can define a default location data transmission rate. And, by default, the mobile computing device can operate in a normal mode of operation to transmit its location data in accordance with the default location data transmission rate to the network system to facilitate the network-based service. For instance, the mobile computing device can transmit location data every four seconds in accordance with the default location data transmission rate. The provider and/or user applications can also define a reduced location data transmission rate in which location data is transmitted to the network system less frequently than the default location data transmission rate. In this manner, the mobile computing device can conserve power and/or network data usage by dynamically determining to enter a low-power mode of operation to transmit its location data in accordance with the reduced location data transmission rate. As an alternative or in addition, the default and/or reduced location data transmission rates can be defined by the hardware or operating system of the mobile computing device. Furthermore, the network-based service can vary the default and/or reduced transmission rates based on geographic location, device type, device hardware information, and the like. In certain examples, the mobile computing device can also dynamically vary the location data transmission rate based on one or more factors discussed herein (e.g., service progress information, network connectivity metric, device information, battery-usage history, geographic location, movement speed as indicated by location data, etc.). In some implementations, the reduced location data transmission rate can correspond to a stoppage in the transmission of location data to the network system.

According to various implementations, the mobile computing device can begin transmitting location data to the network system upon a dedicated application being executed on the mobile computing device (e.g., a provider or user application). Upon initializing the dedicated application for the network-based service, the mobile computing device can operate in the default mode to transmit location data to the network system over one or more networks in accordance with the default location data transmission rate. While operating in this first mode, the dedicated application can determine whether to cause the mobile computing device to enter into the power-saving mode to conserve battery power and/or network data usage. Once the mobile computing device begins operating in the power-saving mode, location data is transmitted to the network system in accordance with the reduced location data transmission rate.

As described herein, the dedicated application and/or the mobile computing device can determine to enter the power-saving mode to transmit location data at the reduced location data transmission rate based on a variety or combination of information, such as a device power status of the mobile computing device, information relating to the network service managed by the network system (e.g., a service status, service progress information, etc.), battery usage history of the mobile computing device, a speed of the mobile computing device as indicated by the location data, a network connection of the mobile computing device, network connectivity metrics, a GPS (or equivalent such as GLONASS) signal strength, other information regarding the mobile computing device (e.g., device model, device type, etc.), and the like. In this manner, the rate at which mobile computing device transmits location data to the network system can be dynamically adjusted based on a variety of available information. For instance, in certain situations where the network system can estimate the mobile computing device's location with sufficient accuracy using information other than location data generated by the mobile computing device, the data transmission rate can be dynamically adjusted such that location data is transmitted to the network system less frequently (or not transmitted at all). As another example, under certain circumstances where the network service does not require frequent location updates from the mobile computing device, the location data transmission rate can be similarly adjusted such that location data is transmitted less frequently. Additionally, based on the variety of available information, the mobile computing device can adjust a location polling rate at which the mobile computing device's location-aware resources (e.g., GPS and/or GLONASS receivers, etc.) are polled for location data. Accordingly, in addition to being able to dynamically adjust the frequency at which the location data is transmitted to the network system, the mobile computing device can be configured to dynamically adjust the frequency at which its location-aware resources are activated.

In one aspect, the mobile computing device can determine to enter the power-saving mode based on a power status of the mobile computing device. The power status can include information regarding whether the device is coupled to an external power source and/or the current level of an onboard battery of the device. In one variation, the mobile computing device can be configured to maintain a default location data transmission rate while the device is connected to an external power source or while the battery level of the device is at or above a threshold value (e.g., 30% or 50% of full capacity). The mobile computing device can determine to reduce the location data transmission rate based, at least in part, on power status information indicating that the device is disconnected from the external power source and/or that the battery level drops below the threshold level.

In another aspect, the mobile computing device can determine to enter the power-saving mode based on information relating to the network-based service. The information can be received from the network system or can be locally generated by the provider application or the user application executing on the device. The information relating to the network-based service can be service progress information (e.g., a status of a service provider, a status of the requesting user, ETA to the service location, ETA to the destination location, etc.). In the context of a service provider device, the device can determine to adjust the location data transmission rate based, for example, on the status of the service provider operating the device. In a first instance, the service progress information can further indicate that a service provider has rendezvoused with a requesting user and is currently providing transport services for the user. In this instance, the network system may not need highly accurate and up-to-date location data for the service provider. Accordingly, based at least in part on this service progress information, the provider device can determine to transmit the location data at the reduced rate. In contrast, in a second instance, the service progress information can indicate that the service provider is currently not providing services for any users and is waiting for an invitation from the network system. In this case, it can be desirable for the network system to receive accurate and frequently-updated location data from the provider device to enable the network system to effectively determine whether the service provider is an optimal service provider to fulfill a specific service request based on the service provider's location. Thus, based at least in part on this service progress information, the provider device can determine to maintain transmission of location data at the default rate. In some examples, information related to the network-based service that is used by the mobile computing device to determine whether to adjust its location data transmission rate can include a service type. For instance, a service provider can operate as a courier for a delivery service and as a driver for a transport service. And the device can determine to adjust the location data transmission rate based on whether the service provider is currently operating as a courier for the delivery service or as a driver for the transport service.

In another aspect, the mobile computing device can determine to enter the power-saving mode based on a connectivity metric of one or more network connections and/or on signal strength information. In one example, the mobile computing device can dynamically reduce the location data transmission rate based on a connectivity metric of a network connection used to transmit location data to the network system (e.g., a cellular data connection) being below a certain threshold. The connectivity metric can be an indication of latency, data bandwidth or throughput, packet loss, etc. In another example, the mobile computing device can dynamically reduce the location data transmission rate based on a signal strength information associated with the location-aware resource of the mobile computing device being below a threshold value. Thus, a provider or user device can be configured to reduce the location data transmission rate based, at least in part, on the device entering an area of poor cellular data connectivity or a region having poor GPS signal reception.

In one other aspect, the mobile computing can determine to enter the power-saving mode based on one or more wireless connections of the mobile computing device. In one variation, the mobile computing device can be configured to dynamically adjust the location data transmission rate based on one or more Wi-Fi, Bluetooth, NFC, or other wireless connections. For instance, when a service provider operating as a courier for a network-based delivery service arrives at a vendor to pick-up items selected by a requesting user, the provider device operated by the service provider can connect to a Wi-Fi network at the vendor or initiate a Bluetooth connection to a device located at the vendor (e.g., a Bluetooth-enabled beacon associated with the network-based delivery service). In response to the Wi-Fi or Bluetooth connection being established with a device located at the vendor, the mobile computing device can dynamically reduce the location data transmission rate such that location data is transmitted less frequently. In a variation, while maintaining such a wireless connection, the mobile computing device can be configured to enter the power-saving mode to stop transmitting location data generated by location-aware resources (e.g., GPS, GLONASS, etc.) to the network system entirely. The mobile computing device can be configured to resume transmitting location data (e.g., by exiting the power-saving mode) to the network system (e.g., by adjusting the location data transmission rate to the default rate) in response to the Wi-Fi or Bluetooth connection being terminated.

In yet another aspect, the mobile computing device can determine to enter the power-saving mode based on a rate of change of the mobile device's location. For instance, the mobile computing device can, based on the location data generated by its location-aware resources, determine a first location of the device at a first time and a second location of the device at a second time that is subsequent to the first time. The device can compute a distance between the first location and the second location and determine the speed at which the mobile device is being moved. In this manner, the mobile computing device can determine to enter the power-saving mode to transmit location data to the network system at the reduced location data transmission rate based on a determination that the mobile computing device is moving below a speed threshold. In such instances, because the device is moving relatively slowly (e.g., provider being stuck in traffic, etc.), the reduced location data transmission rate can be utilized—and therefore power-savings can be achieved—without sacrificing much in terms of accuracy of the device's location.

According to embodiments, the mobile computing device can determine to enter the power-saving mode based on information specific to the particular mobile computing device. In one variation, the location data transmission rate can be adjusted based on a device type (e.g., a mobile phone, a tablet computer, etc.). In another variation, the location data transmission rate can be adjusted based the mobile computing device's device model. In addition to or as alternative, the location data transmission rate can be adjusted based on a battery usage history of the device. For example, a machine-learned model of the device's battery usage can be generated over time as the device is used in connection with the network-based service, and the location data transmission rate can be adjusted based on the machine-learned model.

According to certain implementations, the dedicated application and/or the mobile computing device can determine to adjust the location data transmission rate based on a variety of parameters and information. The device can perform a multi-variate analysis of a plurality of parameters to determine whether to adjust the location data transmission rate. As a result, in certain circumstances, a certain parameter value (e.g., battery level being below a threshold value) can cause the device to determine to adjust the location data transmission rate. In other circumstances, the same parameter value in combination with other parameters (e.g., service progress information) can cause the device to determine to not adjust the location data transmission rate. An example of the above-described operations can be illustrated with respect to a power status parameter and service progress information. In a first instance, the power status of the device can indicate that the device's battery is below a threshold level (e.g., 30%) and the service progress information received from the network system can indicate that the service provider operating the device is unavailable to fulfill incoming service requests. Based on the combination of these two parameters, the device can determine to adjust the location data transmission rate to a reduced rate to operate in a battery-saving mode to conserve battery power. In a second instance, the same power status can also indicate that the device's battery is below the threshold level but the service progress information can indicate that the service provider is available to fulfill incoming service requests and/or has just been identified as an optimal service provider to fulfill a particular service request. Based on the combination of such parameters, the device can determine not to adjust the location data transmission rate. In this manner, important functions being performed by the network system that requires accurate and up-to-date location information of the service provider (e.g., being identified as an optimal service provider for incoming service requests, receiving optimal routes to service/destination locations generated by the network system) can be ensured to not be interrupted or compromised. At the same time, in other circumstances where accurate and up-to-date location information of the service provider is not required by the network system, power savings can be achieved.

In addition, the multi-variate analysis can be performed by weighting each of the parameters. The parameters can be individually weighted based on historical battery usage of the device. In some variants, the parameters can be weighted in accordance with a machine-learned model that is specifically generated for the particular device. For instance, if historical data indicates that the device typically uses a lot of battery power in maintaining cellular data connections (e.g., due to poor reception), the metric with respect to network connectivity can be more heavily weighted in the machine-learned model. As a result, the device can be configured to more aggressively adjust the location data transmission rate based on the network connectivity metric compared to another device. In addition, if the historical data further indicates that the battery of the device drains more rapidly as the battery level approaches a critical level (e.g., due to battery degradation or aging battery), the parameter with respect to power status can be more heavily weighted in the machine-learned model and/or the threshold battery level can be adjusted accordingly. As a result, the device can be configured to more aggressively adjust the location data transmission rate based on the device's current battery level compared to another device.

According to embodiments, by operating in the power-saving mode and by varying the location data transmission rate, the mobile computing device can enable its sub-systems, such as its processor(s) or its location-aware resources, to enter power-saving or standby states. For instance, in the default mode, the processor(s) periodically (e.g., every four seconds) poll the location-aware resources for location data. In the default mode, the frequent polling and transmission of location data can prevent the processor(s), location-aware resources, and networking sub-system (e.g., cellular radio, Wi-Fi radio, etc.) of the mobile computing device to enter their respective standby modes. In comparison, in the power-saving mode, in addition to being transmitted to the network system less frequently, location data can also be polled less frequently. In this manner, the processor(s), location-aware resources, and/or the networking sub-system can be allowed to periodically enter their respective standby states (e.g., a deep sleep state for a processor) to conserve energy consumption.

In certain implementations, the mobile computing device can further operate in a high-accuracy mode to transmit its location data to the network system at a higher rate than the default rate. The mobile computing device can determine to operate in this high-accuracy mode based on a variety of parameters discussed herein and can dynamically switch from the default mode or the power-saving mode to the high-accuracy mode as needed in response to the determination. In one particular implementation, the mobile computing device can determine to operate in the high-accuracy mode based on the speed at which the mobile computing device is being moved (e.g., as determined based on the device's location data). For instance, the device can determine to operate in the high-accuracy mode based on the speed of the device being above a threshold level. In addition, the mobile computing device can further determine, at least in part, whether to operate in the high-accuracy mode based on the power status of the mobile computing device. For example, the mobile computing device can determine not to switch to the high-accuracy mode based on the power status indicating that the device is not coupled to an external power source or that the battery level of the device is below a threshold level. While operating in the high-accuracy mode, the mobile computing device can poll its location-aware resources (e.g., GPS receiver, etc.) more frequently than in the default mode to obtain more frequently-updated location data to transmit to the network system. By being able to dynamically switch to the high-accuracy mode to transmit location data in accordance with a rate that is higher than the default location data transmission rate, the mobile computing device can supply the network system with more accurate and frequently-updated location data as needed (e.g., while a service provider is traveling along a highway at highway speeds).

In the examples described herein, the network system can determine or estimate a location of the mobile computing device when the device is operating in the power-saving mode to transmit location data at the reduced location data transmission rate. In certain situations, the network system can utilize other sources of information such as location information associated with or transmitted by a Wi-Fi access point or Bluetooth beacon to which the mobile computing device is communicatively coupled. Under other circumstances, the network system can estimate the location of the mobile computing device based on, for example, the last-known location of the mobile computing device (e.g., based on the location data transmitted from the device, or other information), speed of the mobile computing device, traffic information, etc.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system in communication with user devices and provider devices, in accordance with examples described herein. The network system 100 can manage an on-demand network service (e.g., an on-demand transport service, an on-demand delivery service, etc.) that connects requesting users 182 with service providers 192 that are available to fulfill the users' service requests 183. The network system can provide a platform that enables on-demand services to be provided by an available service provider 192 for a requesting user 182 by way of a user application 181 executing on the user devices 180, and a service provider application 191 executing on the provider devices 190. As used herein, a user device 180 and a provider device 190 can comprise a computing device with functionality to execute a designated application corresponding to the on-demand service managed by the network system 100. In many examples, the user device 180 and the provider device 190 can comprise mobile computing devices, such as smartphones, tablet computers, VR or AR headsets, on-board computing systems of vehicles, smart watches, and the like.

The network system 100 can include a user device interface 115 to communicate with user devices 180 over one or more networks 170 via the user application 181. According to examples, a requesting user 182 wishing to utilize the network service can launch the user application 181 and transmit a service request 183 over the network 170 to the network system 100. In certain implementations, the requesting user 182 can view multiple different service types managed by the network system 100. In the context of an on-demand transport service, service types can include a ride-share service, an economy service, a luxury service, a professional service provider service (e.g., where the service provider is certified), a self-driving vehicle service, and the like. The user application 181 can enable the user 182 to scroll through the available service types. In response to a soft selection of a particular service type, the network system 100 can provide ETA data on a user interface of the user app 181 that indicates an ETA of the closest service provider for the service type, and/or the locations of all proximate available service providers for that service type. As the user scrolls through the available service types, the user interface can update to show visual representations of service providers for that service type on a map centered around the user 182 or a start location set by the user. The user 182 can interact with the user interface of the user application 181 to select a particular service type and transmit a service request 183.

According to embodiments, the network system 100 can include a selection engine 130 that can, in response to receiving the service request 183 from the user device 180, identify a candidate service provider 192 to fulfill the service request 183. The candidate service provider 192 can be identified based on the service provider 192's location relative to a start location of the requested service (e.g., distance to the service location, ETA to the service location, etc.), the service provider 192's availability, a service class associated with service provider 192 (e.g., a ride-share service, an economy transport service, a luxury transport service, a large-capacity transport service, etc.), and the like. In the context of an on-demand transport service, the start location can be a pick-up location where the service provider 192 is to rendezvous with the requesting user 182. In some examples, the start location can be identified in the service request 183. The requesting user 182 can input the start location as an address or by setting a location pin on a map interface of the user application 181. The start location can also be automatically set as the current location of the requesting user 182 (e.g., utilizing location-based resources of the user device 180). As another example, in the context of an on-demand delivery service, the start location can be a restaurant or vendor from which goods are to be picked up by the service provider 192 for delivery to the requesting user 182.

In addition to the start location, the request 183 can further indicate a service location. In the context of an on-demand transport service, the service location can be a drop-off location at which the service provider 192 is to drop off the user 182. In the context of an on-demand delivery service, the service location can be a delivery location at which the service provider 192 is to rendezvous with the user 182 and deliver requested products or merchandize. The requesting user 182 can enter the service location via the user application 181 in a similar fashion as entering the start location (e.g., as an address, using the interactive map of the user application 181, etc.). In certain implementations (e.g., for the on-demand delivery service), the service location can be automatically set as the current location of the user 182.

In various aspects, the selection engine 130 can transmit an invitation 131 to fulfill the service request 183 to the provider device 190 of the identified candidate service provider 192 via the provider device interface 120. In response, the provider application 191 can display a prompt for the service provider 192 to accept or decline the invitation 131. Should the service provider 192 accept the invitation 131, the provider application 191 can cause the provider device 190 to transmit an acceptance 193 to the network system 100. In response to receiving the acceptance 193 from the provider device 190, the network system 100 can perform a series of operations to facilitate the fulfillment of the requested service by the service provider 192. For instance, the network system 100 can include a service engine 125 that can generate an optimal route 161 for the service provider 192 in fulfilling the service request 183. For example, the route 161 can include a segment from the current location of the service provider 192 to the start location associated with the service request 183 and a segment from the start location to the service location associated with the service request 183. The route 161 can also include other intermediate locations such as a drop-off location for another user of a ride-share transport service etc. The provider device interface 120 can transmit the route 161 to the provider device 190 via the one or more networks 170.

To manage the network service and connect requesting users with available service providers, the network system 100 can periodically or continuously receive location information of users and service providers over the one or more networks 170. For instance, the location engine 135 can periodically receive location data 194 of the service provider 192 to determine whether service provider 192 should be identified as a candidate service provider to fulfill a given service request based on the location of the service provider 192. According to embodiments, the provider device 190 can be configured to transmit location data 194 in accordance with a location data transmission rate. The provider device 190 can vary the location data transmission rate to conserve energy consumption. For instance, the provider device 190 can operate in a power-saving mode to lower the location data transmission rate in order to conserve battery power. Similarly, the user device 180 can periodically transmit user location data 184 to the network system 100 in accordance with a location data transmission rate that can be dynamically varied.

According to embodiments, the location engine 135 can be configured to estimate the location of the user device 180 and/or the provider device 190 when user location data 192 and/or provider location data 192 when those devices are operating in the power-saving mode to transmit their respective location data less frequently. For instance, the location engine 135 can estimate the location of the provider device 190 based on the last-received provider location data 192 and a speed of the service provider 192 (e.g., as measured based on received provider location data 192). Map data can also be used to estimate the location of the user device 180 and/or the service provider device 190. In addition, the location engine 135 can use other information to estimate the location of the user device 180 and/or the provider device 190. For example, the provider device 190 can be connected to a Wi-Fi network having a known location (e.g., a vendor associated with the network-based service) and based on the provider device 190 being connected to such a Wi-Fi network, the network system 100 can determine that the service provider device is located at the known location.

Figure 2:
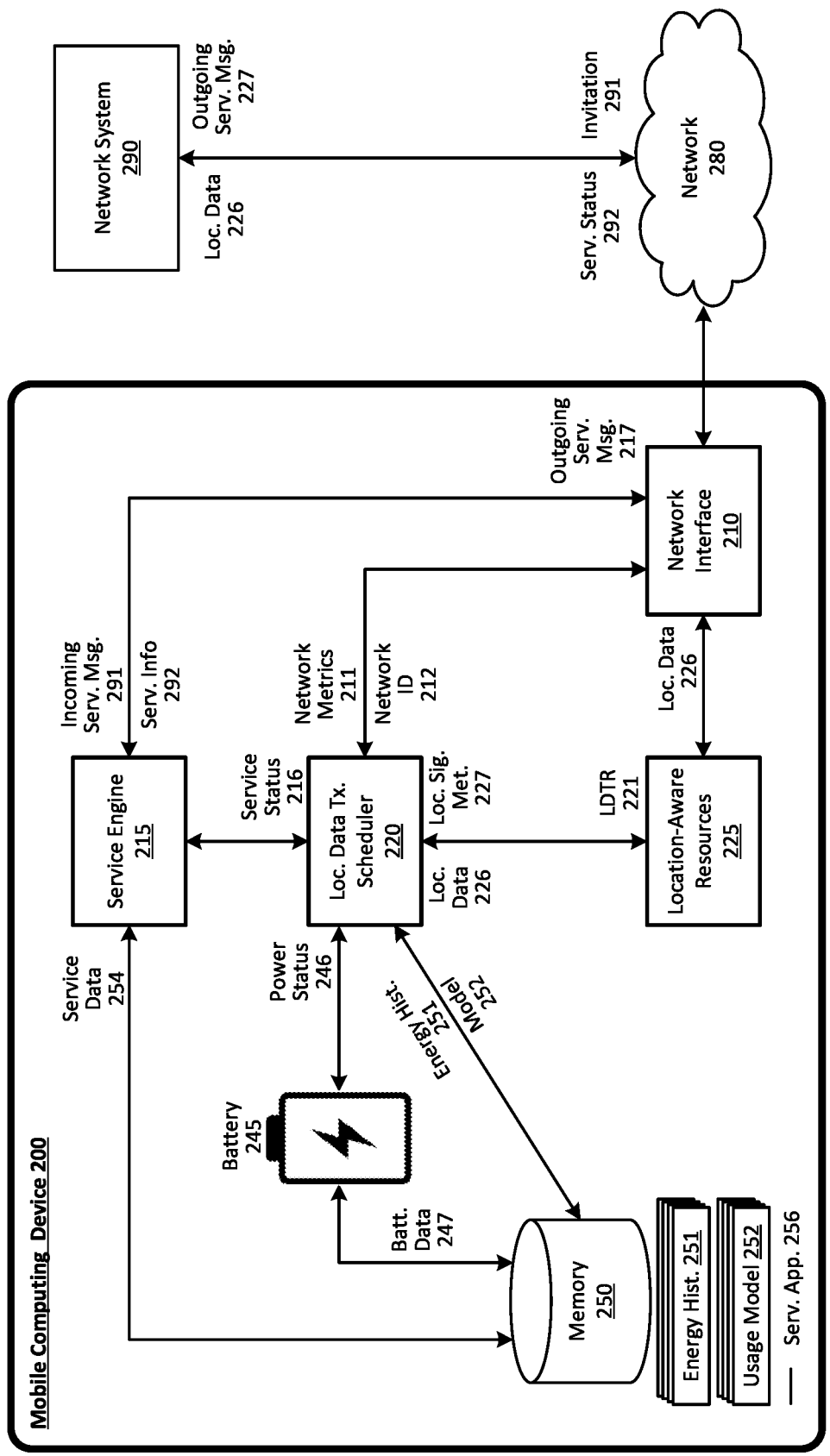
FIG. 2 is a block diagram illustrating an example mobile computing system in communication with a network system, in accordance with examples described herein.

FIG. 2 is a block diagram illustrating an example mobile computing system in communication with a network system, in accordance with examples described herein. In the below description of FIG. 2, reference may be made to features and examples shown and described with respect to FIG. 1. For instance, the network system 290 of FIG. 2 can be an embodiment of the network system 100 illustrated and described with respect to FIG. 1. In addition, embodiments of the mobile computing device 200 can operated as either the provider device 190 or the user device 180, both illustrated and described with respect to FIG. 1.

Referring to FIG. 2, the mobile computing device 200 (or device 200) includes a network interface 210 to communicate with the network system 290 over one or more networks 280. The network system 290 can manage a network-based service and the device 200 can function either as a device operated by a service provider or as a device operated by a user. To provide service providers and users functionalities necessary for the matching of available service providers with requesting users, the device 200 can access a memory 250 (e.g., a flash memory, a solid-state drive (SSD), etc.) to execute instructions corresponding to a dedicated service application 256, which can be a provider application or a user application. The mobile computing device 200 can further include a service engine 215 to manage various aspects of the network-based service relevant to the operator of the mobile computing device 200. To do so, the service engine 215 can, via the network interface 210, receive incoming service message 291 from and transmit outgoing service message 217 to the network system 290. In addition, the service engine 215 can receive service data 254 from the memory 250. The service data 254 can correspond to profile data of the operator of the mobile computing device 200. Furthermore, the service engine 215 can receive service info 292 from the network system 290. The service info 292 can be status information relating to the network-based service.

In an implementation of the mobile computing device 200 as a user device, the service application 256 can correspond to a user application executing on the mobile computing device 200. The user, by interacting with the user application, can submit a request for the network-based service. The request can be transmitted to the network system 290 as the outgoing service message 217. The request can indicate a service location at which a service provider invited by the network system 290 is to rendezvous with the requesting user. In the context of an on-demand transport service, the service location can correspond to a pick-up location. The request can further indicate a destination location at which the service provider is to drop off the requesting user. In the context of an on-demand delivery service, the service location can correspond to a location at which the service provider is to drop off an item requested by the user. The service location can be entered or selected by the user via the user application (e.g., by entering an address, by selecting on a map user interface, etc.) or can be determined based on location data 236 generated by a location resource 235 (e.g., GPS, GLONASS, Galileo, or BeiDou receiver) of the mobile computing device 200. After the request is received and processed by the network system 290, the mobile computing device 200 can receive service info 292 to provide updates and information to the requesting user. For example, based on the service info 292, user application can render a map showing the location of the user and a service provider identified by the network system 290 to service the request. The user application can further display information such as an ETA of the service provider at the service location, an ETA to the destination location, identifying information associated with the service provider (e.g., a color of the service providers vehicle, the service provider's name, etc.), and the like. The user device can transmit location data 226 to the network system 290 to enable the network system 290 to generate service information 292 that reflects the requesting user's current location. For instance, based on the location data 226, the network system 290 can generate turn-by-turn walking directions to the service location for the requesting user to rendezvous with the service provider. As discussed herein, the mobile computing device 200 operating as a user device can transmit the location data 226 to the network system in accordance with a location data transmission rate that can be dynamically adjusted to conserve energy usage and/or network data usage.

In an implementation of the mobile computing device 200 as a provider device, the service application 256 can correspond to a provider application associated with the network-based service. While the provider application is executing on the mobile computing device (either during background execution or active foreground execution), the mobile computing device 200 can transmit location data 226 to the network system 290. As discussed herein, the mobile computing device 200 operating as a provider device can transmit the location data 226 to the network system in accordance with a location data transmission rate that can be dynamically adjusted to conserve energy usage and/or network data usage. Based at least in part on the location data 226, the network system 290 can identify the service provider as an optimal service provider to fulfill a given service request from a requesting user. The network system 290 can transmit an invitation as the incoming service message 291 to the mobile computing device upon identifying the service provider as the optimal service provider for the given request. In response to receiving the invitation, the provider application can display a prompt on the mobile computing device 200 to enable the service provider to accept or decline the invitation. Should the service provider accept the invitation via the provider application, the service engine 215 can cause an acceptance to be transmitted over the one or more networks 280 to the network system 290 as the outgoing service message 217. After the invitation has been accepted by the service provider, the provider device can continue to periodically transmit location data 226 to the network system 290 (e.g., in accordance with a dynamically variable location data transmission rate). Using the location data 226 received from the provider device, the network system 290 can, for example, determine an optimal route for the service provider to the service location and/or the destination location. In addition, in response to receiving the acceptance, the network system 290 can transmit service info 292 to the mobile computing device 200. The service info 292 in this instance can include information regarding the requesting user and the requested service. For example, based on the service info 292, the provider application can render turn-by-turn navigation directions for the service provider (e.g., to the service location, to a destination location, etc.). The service application can further display information regarding the requesting user so that the service provider can identify the requesting user at the rendezvous location.

In some examples, the device 200 can include location-aware resources 225. The location-aware resources 225 can comprise one or more receivers for GPS, GLONASS, Galileo, and/or BeiDou satellite navigation systems. The location-aware resources 225 can generate location data 226 that indicates a geographical position or coordinate of the mobile computing device as determined based on signals received from the satellite navigation system(s). The device 200 can poll the location-aware resources 225 for location data 226 based on a location data transmission rate 221, which can be determined by a location data transmission scheduler 220. For example, if the location data transmission rate 221 indicates a transmission of location data to the network system 290 every four seconds, the location-aware resource 225 can be polled once every four seconds for location data 226. The polled location data 226 can then be transmitted to the network system 290 via the network interface 210 over network(s) 280 in accordance with the location data transmission rate 221. In examples, the location-aware resources 225 can automatically enter respective power-saving or standby states, depending on the frequency that the location-aware resources 225 are being polled. Under certain higher location data transmission rates, the location-aware resources 225 can be prevented from entering the low-power or standby states. When the location data transmission rate 221 is sufficiently low, the location-aware resources 225 can enter the low-power or standby state each time after being polled for location data 226.

According to embodiments, the device 200 includes a battery 245 for powering the device 200 when the device 200 is not coupled to an external power source (e.g., a USB AC adapter, a wireless power charger, etc.). The battery can generate battery-usage data 247 which can be stored in the memory 250 as the device's energy history record 251. The battery-usage data 247 can correspond to information such as energy consumption rates. The energy consumption rates can be granularized to indicate energy consumed by individual applications executing on the device 200. For instance, the battery-usage data 247 can include information regarding the energy consumed by the service application 256 over a period of time. In certain examples, the battery-usage data 247 can be further granulized to include information pertaining to energy consumed by specific activities performed by an individual application or by the device 200. As an example, the battery-usage data 247 can include detailed information regarding the energy consumed by the service application 256 and the device 200 to periodically poll location data 226 from the location-aware resources 225 and periodically transmit the location data 226 to the network system 290.

In some examples, the battery 245 (or another component of the device 200's power subsystem) can also generate a power status 246. The power status 246 can indicate whether the device 200 is operatively coupled to an external power source (e.g., AC adapter, wireless charger, etc.) and/or the current charge level of battery 245. The power status 246 can further indicate whether an external power source coupled to the device 200 is supplying sufficient power to the device 200 to charge the battery 245. In this manner, the power status 246 can indicate if an external power source coupled to the device 200 is a low-powered device that is slowly charging the battery 245 or not charging the battery 245 at all. Similarly, the power status 246 can indicate if external power source is a high-amperage charger capable of rapidly charging the battery 245. The device 200 can further utilize the battery-usage data 247 and the energy-usage history 251 to generate a machine-learned battery usage model 252. The usage model 252 can be predictive of a time remaining for the device to operate on battery power based on past energy-usage history 251.

According to embodiments, the mobile computing device 200 can include a location data transmission scheduler 220 that can determine a location data transmission rate 221. The location data transmission scheduler 220 can determine the location data transmission rate 221 based on various data, signals, and information received from other components of the mobile computing device 200 and/or the network system 290, as discussed herein. In some examples, the location data transmission rate 221 can be dynamically determined by the location data transmission scheduler 220. The location data transmission scheduler 220 can dynamically determine the location data transmission rate to be higher or lower. In other examples, the location data transmission rate 221 can be dynamically varied between two or more predetermined rates, such as a default rate (e.g., transmission of location data every four seconds), a reduced rate (e.g., a rate at which location data is transmitted less frequently to the network system 290 than at the default rate), and/or a high-accuracy rate (e.g., a rate at which location data is transmitted more frequently to the network system 290 than at the default rate). The transmission of location data 226 to the network system 290 in accordance with the default rate can correspond to the device 200 operating in a default mode of operation. And the transmission of location data 226 to the network system 290 in accordance with the reduced rate can correspond to the device 200 operating in a power-saving mode of operation. Thus, the location data transmission scheduler 220 can dynamically vary the operation of the mobile computing device 200 between the default mode to transmit the location data 226 at the default rate and the power-saving mode to transmit the location data 226 at the reduced rate.

According to one aspect, the location data transmission scheduler 220 can determine to adjust the location data transmission rate 221 based on the power status 246. For instance, the device 200 can be configured to operate in the default mode to transmit location data 226 at the default rate based on the power status 246 indicating that the device 200 is coupled to an external power source that is supplying sufficient power to charge the battery 245. The device 200 can be further configured to switch to the energy-saving mode to transmit location data 226 at the reduced rate based on the power status 246 indicating that the device 200 is operating on battery power and that the battery level of the battery 245 is at or below a threshold level.

According to another aspect, the location data transmission scheduler 220 can determine to adjust the location data transmission rate 221 based on information relating to the network-based service, such as service status 216 generated by the service engine 215. The service status 216 can be generated by the service engine 215 in response to service info 292 received from the network system 290. The service status 216 can also be generated based on an input via the dedicated service application 256 executing on the device 200. The service status 216 can indicate a status of a service provider or a user operating the device 200 with respect to the network-based service. The service status 216 can also indicate information such as an ETA to the service location, an ETA to the destination location, and the like.

In certain implementations, the location data transmission rate 221 for the device 200 operating as a provider device can be varied based on whether the service status 216 indicates the service provider is available to fulfill service requests. For instance, based on the service status 216 indicating that the service provider is in-progress of providing a service or is otherwise unavailable to fulfill incoming service requests, the location data transmission rate 221 can be set to the reduced rate. On the other hand, based on the service status 216 indicating that the service provider is available for fulfill incoming service requests, the location data transmission scheduler 220 can determine to maintain the default rate as the location data transmission rate 221. In this manner, the device 200 can ensure that the network system 290 receives accurate and frequently-updated location data 226 when the service provider is available to fulfill service requests. As a result, the network system 290 can perform provider selections more accurately based on accurate and frequently-updated location data from each of a plurality of provider devices in a given region. In contrast, when a provider is unavailable to fulfill incoming service requests, the location data transmission rate 221 can be adjusted lower to conserve battery power.

In an example, a service provider is in-progress of fulfilling a first service request from a first requesting user. The requested service can correspond to an on-demand ride-pooling transport service in which the service provider can provide transport services simultaneously to multiple users. The service provider can be en-route to rendezvous with the first requesting user or can have picked up the first requesting user and is en-route to a destination location. The service status 216 can indicate that the service provider is in-progress of providing a ride-pooling service and is available to fulfill incoming service requests. Based at least in part on this information, the location data transmission scheduler 220 can determine not to adjust the location data transmission rate 221. In another example, the service provider is in-progress of fulfilling a second service request from a second requesting user. The requested service can correspond to an on-demand dedicated transport service in which a requesting user is guaranteed his or her own transport vehicle (e.g., no ride-pooling). Similar to the example above, the service provider can be en-route to rendezvous with the second requesting user or can have picked up the second requesting user and is en-route to a destination location. In this case, the service status 216 can indicate that the service provider is in-progress of providing a dedicated transport service is unavailable to fulfill incoming service requests. Based at least in part on this information, the location data transmission scheduler 220 can determine to adjust the location data transmission rate 221 to the reduced rate to conserve battery power.

In a variation, the location data transmission rate 221 can be adjusted based on an ETA indicated by the service status. For instance, the service provider can be en-route, with a requesting user, to a destination location specified in the service request. The service status 216 can indicate that the service provider is in-progress of providing a service and is unavailable to fulfill incoming service requests. In addition, the service status 216 can indicate the service provider's ETA to the destination location. The location data transmission scheduler 220 can determine to adjust the location data transmission rate 221 based at least in part on the ETA information. For instance, based at least in part on the ETA being above a threshold value (e.g., 5 minutes), the location data transmission scheduler 220 can determine to adjust the location data transmission rate 221 to the reduced rate. On the other hand, based at least in part on the ETA being below the threshold value, the location data transmission scheduler 220 can determine to adjust the location data transmission rate 221 to the reduced rate. In this manner, the device 200 can conserve battery power while the service provider is in-progress of providing the service but accurate and frequently-updated location data 226 can be guaranteed to be transmitted to the network system 290 just prior to the service provider reaching the destination location. Thus, the network system 290 can effectively perform operations in matching the service provider with incoming service requests in anticipation of the service provider becoming available to fulfill service requests after reaching the destination location. In addition, the threshold ETA value can be varied based on the demand of users (e.g., historical demand, instantaneous measure of demand, number of users in the region operating the dedicated user application, etc.) in geographic region in which the service provider is operating. For instance, where demand is low, the threshold value can be determined to be higher to allow for accurate and frequently-updated location data to be transmitted earlier to the network system 290.

In certain implementations, the location data transmission scheduler 220 can determine to adjust the location data transmission rate 221 based on information specific to the device 200. In certain implementations, the location data transmission rate 221 can be adjusted based on information relating to the device model, type, and/or hardware. For instance, based on information indicating that the device 200 is of a model that is known to have long battery life (e.g., by referencing a benchmark testing resource, etc.), the location data transmission scheduler 220 can determine to enter into the power-saving mode less often. In some implementations, the energy-usage history 251 and/or the usage model 252 can be used to determine whether to adjust the location data transmission rate 221. The usage model 252 can be a machine-learned model that is generated based on energy-usage history 251 data collected over time by the device 200. For instance, the energy-usage history 251 and/or usage model 252 can indicate that the device 200 is typically heavily used by the user for energy-intensive tasks (e.g., editing photos, playing intensive games, etc.) between 2:00 PM and 5:00 PM on weekdays. Based on this indication, the mobile computing device 200 can determine to set the location data transmission rate 221 at the reduced rate to conserve power ahead of the period of anticipated heavy usage. As an example, while the device 200 is being used by a service provider in connection with the network-based service, the device 200 can, at 10:00 AM on a Monday, to determine to set the reduced rate as the location data transmission rate 221 to conserve power such that the device 200 can be expected to operate on battery power during the period of anticipated heavy usage between 2:00 PM to 5:00 PM.

In an example, the location data transmission scheduler 220 can determine the location data transmission rate 221 based on network metrics 211 generated by the network interface 210. The network metrics 211 can indicate one or more metrics and performance characteristics of the network(s) 280 over which the device 200 communicates with the network system 290. The network metrics 211 can include indications of latency, data bandwidth or throughput, packet loss, signal strength, etc. The network interface 210 can periodically perform measurements on the network(s)

280, such as transmitting test packets, to determine the network metrics 211. Based on the network metrics 211, location data transmission scheduler 220 can dynamically determine the location data transmission rate 221. As one example, when the mobile computing device 200 is in an area of poor cellular coverage resulting in poor network metrics 211, the mobile computing device 200 can be configured to enter the power-saving mode to transmit location data 226 at the reduced rate.

In one other aspect, the location data transmission scheduler 220 can determine the location data transmission rate 221 based on a location signal metric 227 generated by the location-aware resources 225. The location signal metric 227 can indicate one or more signal strengths of the satellite navigation system(s) utilized by the location-aware resources 225 (e.g., a GPS signal strength). The location signal metric 227 can further indicate whether a receiver of the location-aware resources 225 is able to obtain a lock or a fix on the location of the mobile computing device 200. As an example, the device 200 can enter an area of poor coverage by GPS signals and the location signal metric 227 can indicate that the GPS receiver of the device 200 is unable to obtain a fix on the location of the device 200. Based on such a location signal metric 227, the location data transmission scheduler 220 can determine to set the location data transmission rate 221 as a reduced rate to operate the mobile computing device 200 in a power-saving mode. In this manner, resources can be saved from frequent wasteful polling of the GPS receiver while the device 200 is in the region of poor GPS signal. Once the GPS receiver obtains a lock on the location of the device 200, the location data transmission scheduler 220 can set the location data transmission rate 221 back to the default rate.

In another aspect, the location data transmission scheduler 220 can determine the location data transmission rate 221 based on one or more wireless links or connections of the device 200. The wireless links or connections can be a Wi-Fi, Bluetooth, or NFC connection. In certain implementations, the location data transmission scheduler 220 can receive a network ID 212 from the network interface 210 and, based on the Network ID 212, can determine whether to adjust the location data transmission rate 221. The Network ID 212 can be a Wi-Fi network identifier (e.g., Wi-Fi network name (service set identifier (SSID)), MAC address of a router or access point, etc.), a Bluetooth identifier (e.g., MAC address of a Bluetooth beacon, etc.), and the like. Upon initiating a wireless connection, the device 200 can perform a lookup of the Network ID 212 within a database stored in the memory 250 or on network system 290. If the Network ID 212 matches a set of known network ID's, the location data transmission scheduler 220 can determine to alter the location data transmission rate 221. For instance, the location data transmission scheduler 220 can determine to set the location data transmission rate 221 to the reduced rate or to a zero rate to stop the transmission of location data altogether. Upon the network connection being disconnected, the device 200 can determine to set the location data transmission rate 221 back to the default rate. The device 200 can also perform these functionalities without a connection being fully established—for instance, the location data transmission rate 221 can be varied based on the device 200 detecting a network signal (e.g., Wi-Fi, Bluetooth, NFC, etc.) without authenticating and fully establishing a working wireless network connection. In an example, a service provider for an on-demand delivery service can enter an establishment (e.g., a merchant, a vendor, a restaurant, etc.) to pick up items selected by a requesting user. The establishment may have a Wi-Fi network or a Bluetooth beacon device that is registered with the on-demand delivery service. In response to the device connecting to or detecting a signal from the registered network(s) or device(s), the location data transmission scheduler 220 can determine to stop transmitting location data to the network system 290. During this time, the network system 290, for purposes of managing the on-demand delivery service, can assume that the device 200 is located at the establishment. After the service provider leaves the establishment and the device 200 is out of range of the wireless network(s) or signal(s), the location data transmission scheduler 220 can determine to transmit location data 226 at the default rate.

In another aspect, the location data transmission scheduler 220 can determine the location data transmission rate 221 based on the speed at which the device 200 is being moved. The location data transmission scheduler 220 can receive location data 226 from the location-aware resources 225 to determine the speed of the device 200. At a high-level, if it is determined that the device 200 is moving below a threshold speed, the location data transmission scheduler 220 can determine to set the location data transmission rate 221 to the reduced rate. The location data transmission rate 221 can also be a rate that is dynamically-determined based on the speed of the device 200. In one implementation, based on the location data 226, the location data transmission scheduler 220 can determine a first location of the device 200 at a first time and a second location of the device 200 at a second time that is subsequent to the first time. The location data transmission scheduler 220 can compute a distance between the first location and the second location and determine the speed at which the device is being moved. The distance can be calculated in reference to the route being taken and thus may not be the straight-line distance between the two locations. In addition, while the device 200 is operating in the battery-saving mode to transmit location data 226 to the network system 290 at the reduced rate, the location data transmission scheduler 220 can determine to set the location data transmission rate 221 back to the default rate in response to determining that the device is moving above the threshold speed. In this manner, the device 200's operated by a service provider can operate more optimally in transmitting location data 226 to the network system 290 when the service provider is idling or moving slowly (e.g., stuck in traffic, etc.).

In one embodiment, the location data transmission scheduler 220 can determine the location data transmission rate 221 based on map data and/or live traffic data received from the network system 290 or from a third-party resource. For instance, based on the live traffic data and map data indicating traffic congestion at the location of the mobile computing device 200, the location data transmission scheduler 220 can determine to set the location data transmission rate 221 at the reduced rate.

Methodology

Figure 3:
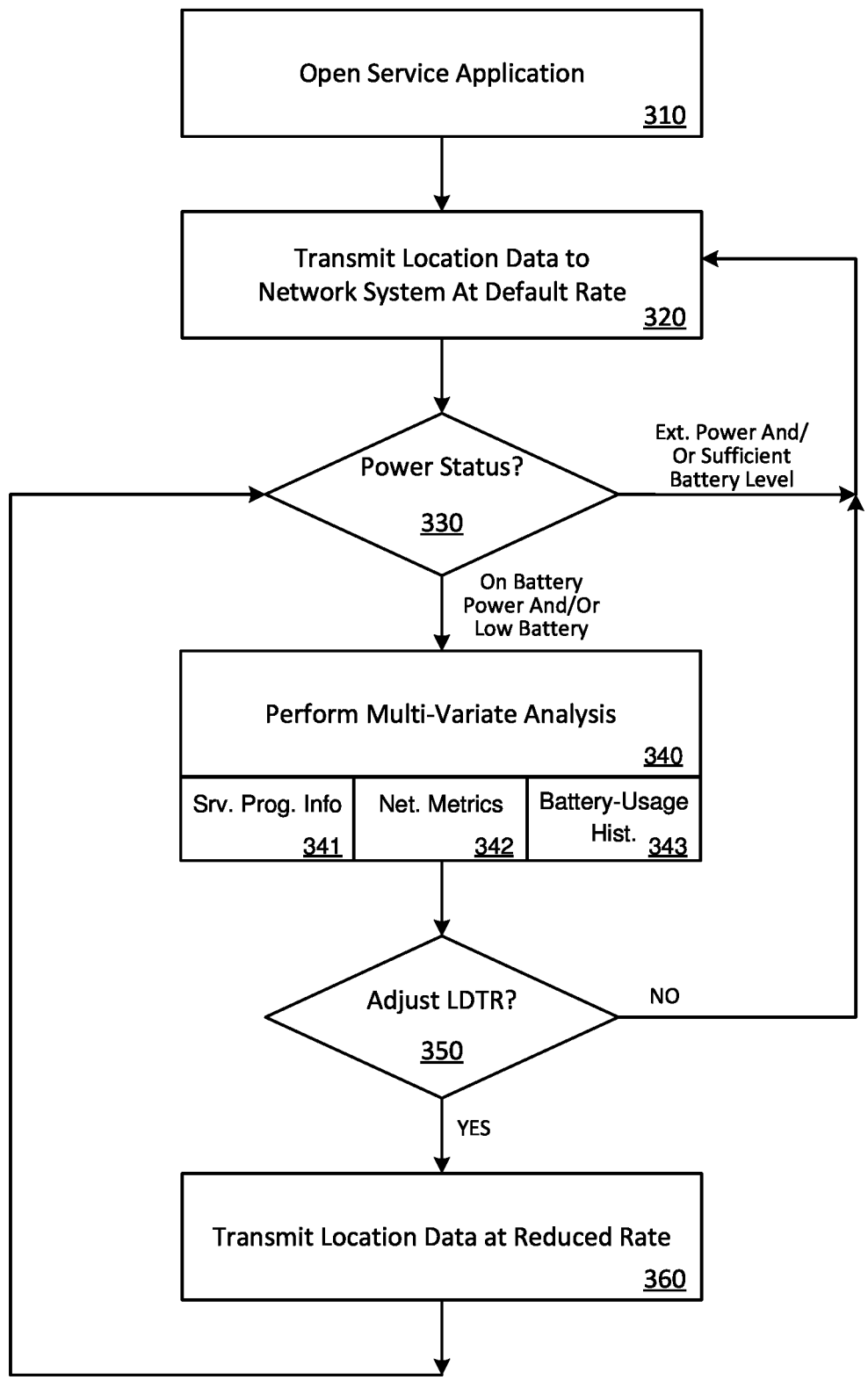
FIG. 3 is a flow chart describing an example method of transmitting location data to a network system, in connection with a network-based service, according to examples described herein.

FIG. 3 is a flow chart describing an example method of transmitting location data to a network system, in connection with a network-based service, according to examples described herein. In the below discussion of FIG. 3, reference may be made to features and examples shown and described with respect to FIG. 2. For instance, the example method illustrated and described with respect to FIG. 3 can be performed by a mobile computing device such as the mobile computing device 200 illustrated and described with respect to FIG. 2.

Turning to FIG. 3, the example method can begin when the operator of the mobile computing device opens a service application associated with the network-based service (310). The service application can be a provider application executing on a mobile computing device of a service provider. The service application can also be a user application executing on a mobile computing device of a user of the network-based service. Once the service application is opened on the mobile computing device, the device can transmit location data to the network system at a default rate (e.g., every four seconds) (320).

At step 330, the mobile computing device evaluates a power status of the device (330). The power status can be power status 246 of FIG. 2. It can be generated by a power sub-system of the mobile computing device and can comprise a variety of indications, including whether the device is operatively coupled to an external power source (e.g., AC power adapter, DC power bank, etc.) and whether the remaining battery life of the mobile computing device is below a threshold level. Based on the power status, the device can determine whether to continue transmitting location data to the network system at the default rate or whether to perform a multi-variate analysis to determine whether to operate in a power-saving mode to transmit location data to the network system at a reduced rate. As illustrated, if the power status indicates that the device is operating on battery power (e.g., not coupled to an external power source) and/or the device's battery level is below a threshold, the device can determine to perform a multi-variate analysis to determine whether to adjust the location data transmission rate. On the other hand, if the power status indicates that the device is coupled to an external power source and/or the device's battery level is above a threshold, the device can determine to continue transmitting location data to the network system at the default rate. If, based on the power status, the device determines to maintain the default rate for transmitting the location data to the network system, the device can subsequently make this determination again. In variations, step 330 can be triggered by a change in the power status of the device. For instance, the device can maintain normal operations to transmit location data to the network system as long as the power status remain the same. But in response to a change in the power status (e.g., coupling to or de-coupling from an external power source, battery level of the device dropping below the threshold level, etc.), the device can perform step 330. As an alternative, the device can periodically examine the power status of the device to determine whether to proceed to performing the multi-variate analysis. In addition, while step 330 is illustrated in FIG. 3 as a prerequisite step performed prior to performing the multi-variate analysis, it can be appreciated that, as an alternative, the power status of the device can be analyzed as a part of the multi-variate analysis to determine whether to dynamically adjust the location data transmission rate. In other example implementations, the power status of the device may not be a part of the multi-variate analysis, and as such, step 330 may not be performed prior to or during the performance of the multi-variate analysis.

At step 340, a multi-variate analysis is performed to determine whether to adjust the location data transmission rate. As discussed herein, step 340 can be performed after a check on the power status. For instance, as illustrated in FIG. 3, the multi-variate analysis can be performed in response to determining that the device is operating on battery power and/or the battery level is low (e.g., below a threshold level value). In this manner, the power-saving mode and the reduced rate for transmitting location data are only engaged when the device is operating on battery power and/or the battery of the device is close to being depleted and the device can maintain the location data transmission rate at the default rate if the device is coupled to an external power source and/or if the battery of the device is sufficiently charged. As an alternative, the power status can be analyzed as a part of the multi-variate analysis such that the device can engage the power-saving mode to transmit location data to the network system at the reduced rate when the device is coupled to an external power source and/or when the battery of the device is sufficiently charged.

In some examples, the multi-variate analysis performed in step 340 can be based on service progress information relating to the network-based service (341). The service progress information can comprise a status of the provider/user with respect to the network-based service, an ETA to a service location or destination location associated with a service request, etc. In various aspects, the multi-variate analysis can also be based on network metrics (342). The network metrics can correspond to a bandwidth, latency, or other network performance measure of the communication link used by the device to communicate with the network system. In certain implementations, the multi-variate analysis can also be based on the battery-usage history of the device (343). These and other parameters may be used in the multi-variate analysis to determine whether to adjust the location data transmission rate.

In some implementations, the multi-variate analysis performed in step 340 can be based be performed based on a machine-learned model that is generated based on data collected specifically for and by the device. For instance, the device can perform the multi-variate analysis by first associating a weight with each of the parameters. And the result of the multi-variate analysis can be an aggregate or multi-dimensional representation (e.g., a sum, a product, a Gaussian function, etc.) of the plurality of parameters. The respective weight for each of the parameters can be determined based on the machine-learned model. In this manner, the weight attached to a particular parameter can be different for a first device compared to a second device. For example, a machine-learned model generated for a first device may place a different weight associated with the network metric parameter compared with a machine-learned model generated for a second device. This may reflect different network characteristics of the first and second devices. For example, the first device may have poorer cellular reception leading to heavy battery drain and the machine-learned model can be generated to conserve battery power more aggressively in the first device. Thus, the machine-learned model generated by the first device can weigh the network metric parameter more than the machine-learned model generated by the second device. In this manner, the first device can be configured to engage the power-saving mode more aggressively in response to the network metric parameter than the second device.

Based on the results of the multi-variate analysis, the device determines whether to adjust the location data transmission rate (350). If the device determines, based on the multi-variate analysis, not to adjust the location data transmission rate, the device can continue transmitting the location data at the default rate (320). On the other hand, if the device determines, based on the multi-variate analysis, to adjust the location data transmission rate, the device can transmit the location data at the reduced rate (360). In certain implementations, instead of or in addition to dynamically switching between a default rate and a reduced rate for transmitting location data, the device can compute a dynamically-determined location data transmission rate. In such instances, the location data transmission rate can be computed on the results of the multi-variate analysis in step 340. After the device begins transmitting location data at the reduced rate (or at a dynamically-determined location data transmission rate), the device can continue to perform functions steps 330-350 to determine whether to adjust the location data transmission rate (e.g., back to the default rate). For instance, while operating in the power-saving mode to transmit data at the reduced rate, the device can adjust the location data transmission rate back to the default rate in response to detecting that the device is coupled to an external power source.

Hardware Diagram

Figure 4:
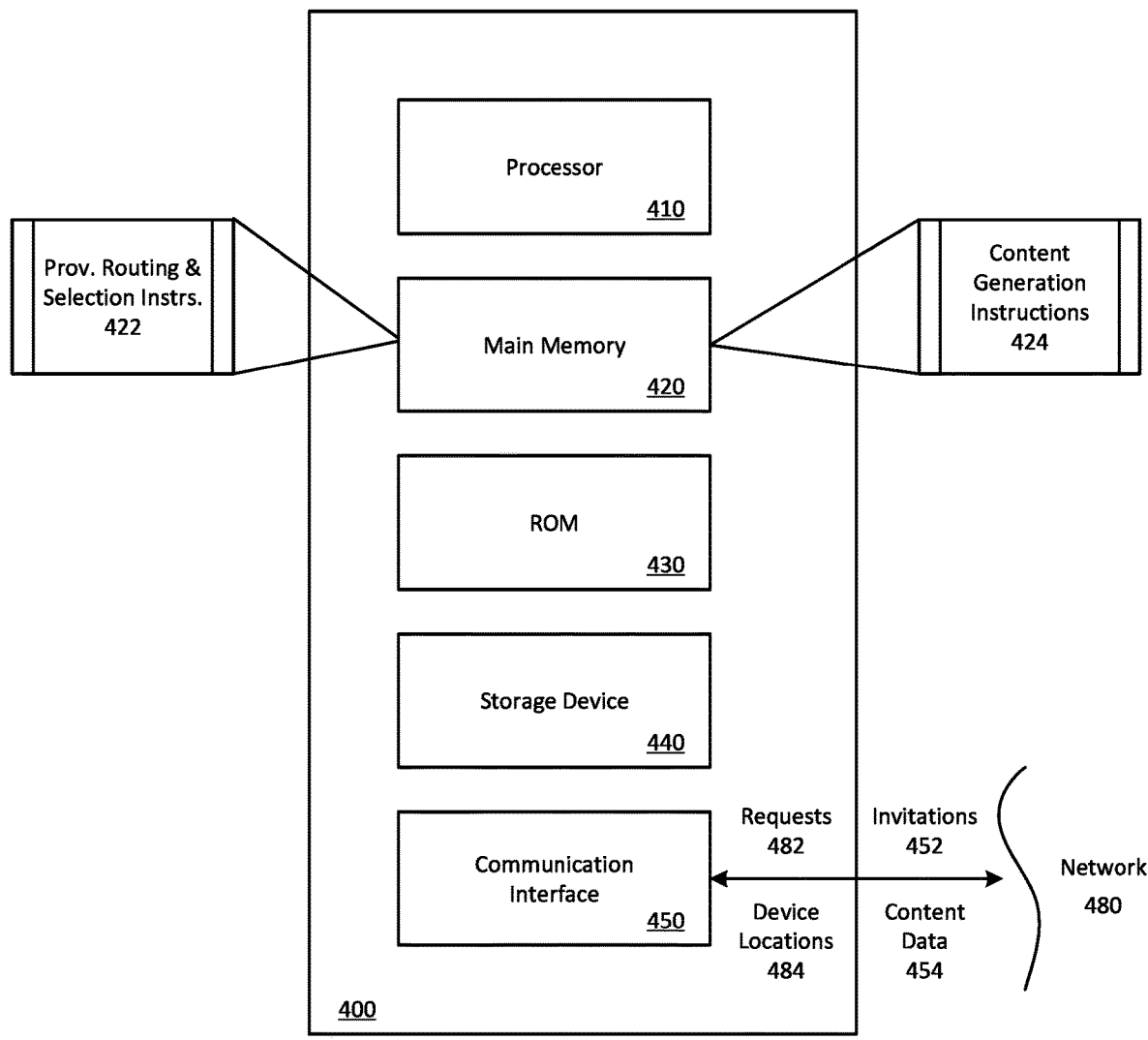
FIG. 4 is a block diagram illustrating a computer system upon which examples described herein may be implemented.

FIG. 4 is a block diagram that illustrates a computer system upon which examples described herein may be implemented. A computer system 400 can be implemented on, for example, a server or combination of servers. For example, the computer system 400 may be implemented as part of a network-based service (e.g., for providing transportation services, delivery services, courier services, etc.). In the context of FIG. 1, the network system 100 may be implemented using a computer system 400 such as described by FIG. 4. In the context of FIG. 2, the network system 290 may also be implemented using one or more computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions.

The communication interface 450 enables the computer system 400 to communicate with one or more networks 480 (e.g., cellular network, Internet, etc.) through use of the network link (wireless or wired). Using the network link, the computer system 400 can communicate with one or more computing devices, one or more servers, and/or one or more self-driving vehicles. In accordance with examples, the computer system 400 receives service requests 482 from mobile computing devices of individual users. The executable instructions stored in the memory 430 can include provider routing and selection instructions 422, which the processor 410 executes to select an optimal service provider to fulfill the service request 482. In doing so, the computer system can receive device locations 484 corresponding to the location data of service providers operating throughout the given region and requesting users. And the processor 410 can execute the service provider routing and selection instructions 422 to select an optimal service provider from a set of available service providers, and transmit an invitation 452 to enable the optimal service provider to accept or decline the invitation 452 to fulfill the service request.

The executable instructions stored in the memory 420 can also include content generation instructions 424, which enable the computer system 400 to access user profiles and other information in order to select and/or generate content data 454 for display on the user and provider devices. The content data 454 can be generated based on information pertaining to the state of the service request (e.g., ETA/destination info).

By way of example, the instructions and data stored in the memory 420 can be executed by the processor 410 to implement an example network system 100 of FIG. 1 or network system of 290 of FIG. 2. In performing the operations, the computer system 400 can receive service requests 482 (e.g., via a user application executing on a user request) and device locations 484 of service providers operating in the region, and generate invitations 452 to facilitate the servicing of the request 482.

The processor 410 is configured with software and/or other logic to perform one or more processes, steps and other functions described with implementations, such as described by FIGS. 1-3, and elsewhere in the present application.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
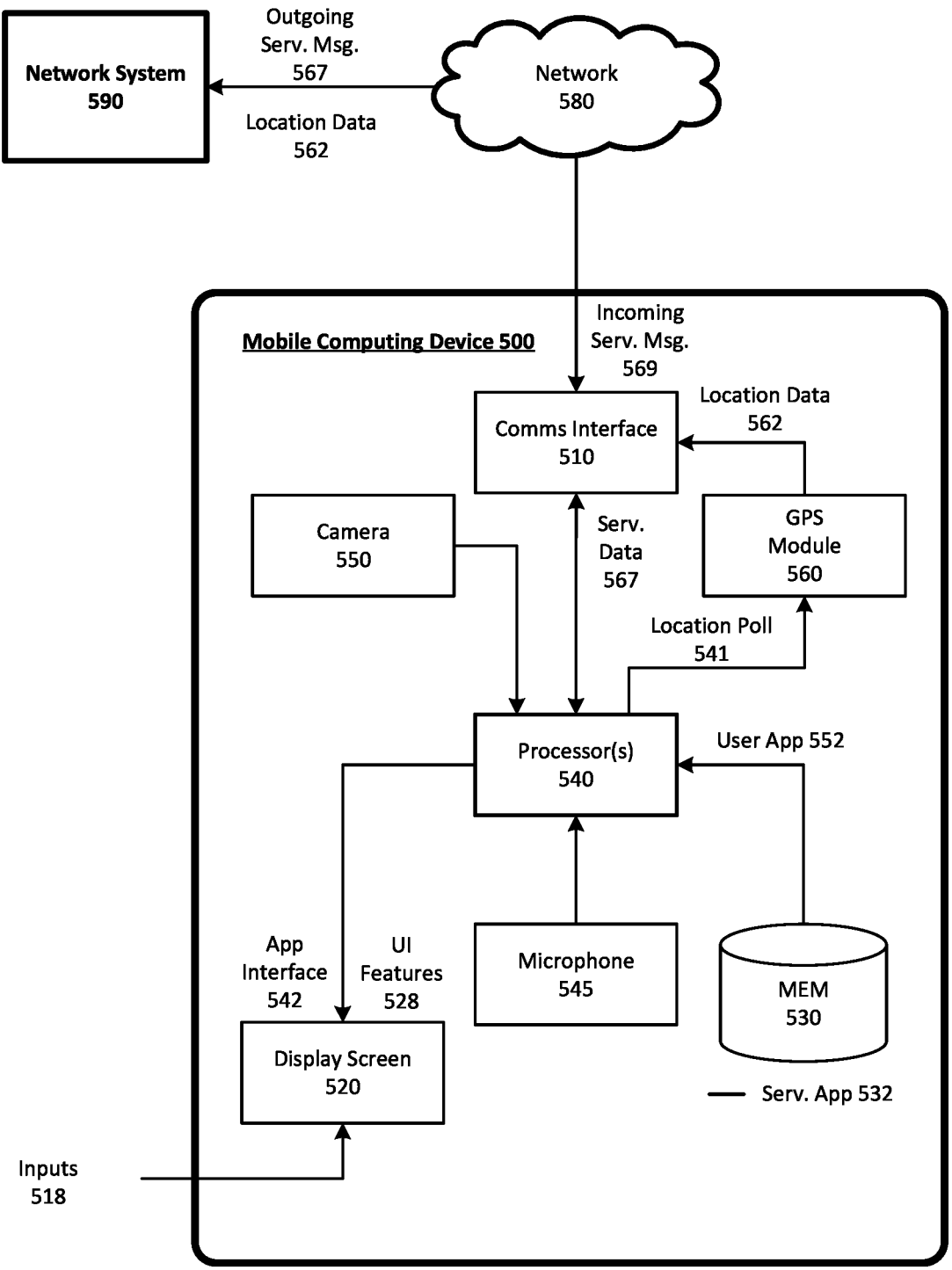
FIG. 5 is a block diagram illustrating an example mobile computing device capable of periodically transmitting location data to a network system, as described herein.

FIG. 5 is a block diagram illustrating an example mobile computing device capable of periodically transmitting location data to a network system, as described herein. In many implementations, the mobile computing device 500 can comprise a mobile computing device, such as a smartphone, tablet computer, laptop computer, VR or AR headset device, and the like. In some cases, such as in an autonomous driving vehicle that can fulfill service requests for a network-based service, the mobile computing device 500 can be an on-board computer of the autonomous driving vehicle. As described herein, examples of the mobile computing device 500 can be used to implement the user device 180 and provider device 190 of FIG. 1 and the mobile computing device 200 of FIG. 2.

According to embodiments, the mobile computing device 500 can include typical telephony features such as a microphone 545, a camera 550, and a communication interface 510 to communicate with external entities (e.g., network system 590 implementing the network-based service) using any number of wireless communication protocols. The mobile computing device 500 can store a designated application (e.g., a service app 532) in a local memory 530. The service application 532 can correspond to one or more user applications for implementations of the mobile computing device 500 as user devices for the network-based service. The service application 532 can also correspond to one or more provider applications for implementations of the mobile computing device 500 as provider devices for the network-based service.

In response to an input 518, the service application 532 can be executed by a processor 540, which can cause an application interface 542 to be generated on a display screen 520 of the mobile computing device 500. In implementations of the mobile computing device 500 as provider devices, the application interface 542 can enable a service provider to, for example, accept or reject invitations 592 to fulfill service requests generated by network system 590. The service requests can be received as incoming service messages 569 and acceptances of the invitations can be transmitting by the mobile computing device 500 to the network system 590 as outgoing service messages 567.

In various examples, the mobile computing device 500 can include a GPS module 560, which can provide location data 562 indicating the current location of the mobile computing device 500 to the network system 590 over a network 580. In some implementations, other location-aware or geolocation resources such as GLONASS, Galileo, or BeiDou can be used instead of or in addition to the GPS module 560. The network system 590 can utilize the current location 562 of the mobile computing device 500 to manage the network-based service (e.g., selecting service providers to fulfill service requests, routing service providers and users, determining service locations for users, etc.).

As described herein, the mobile computing device 500 can dynamically adjust the rate at which location data 562 is transmitted to the network system 590. For instance, based on a multi-variate analysis or optimization process, the mobile computing device 500 can determine to reduce the location data transmission rate such that location data 562 is transmitted to the network system 590 at a lower frequency. In doing so, the processor 540 can poll the GPS module 560 less frequently (e.g., via location poll 541), thus allowing the processor 540 and the GPS module 560 to enter standby or power-saving states. In this manner, the power consumption of the mobile computing device 500 can be optimized.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing device comprising:
a processor; and
memory storing instructions that, when executed by the processor, cause the computing device to:
operate in a default mode to periodically transmit location data of the computing device to a network system;
while operating in the default mode, determine, using a machine-learned model to perform a multi-variate analysis including weighting one or more parameters associated with transmitting the location data, the one or more parameters comprising at least (i) a power status of the computing device and (ii) a connectivity metric of a network connection, wherein the multi-variate analysis is specific to the computing device such that, when the multi-variate analysis is performed on a different computing device, at least one of the one or more weighted parameters for the computing device are different from at least one of the one or more weighted parameters for the different computing device, whether to operate in an alternate power mode to transmit the location data to the network system based, at least in part, on: (i) the power status of the computing device, and (ii) the connectivity metric of the network connection of the computing device; and
in response to determining to operate in the alternate power mode, operate in the alternate power mode to periodically transmit the location data of the computing device to the network system more frequently or less frequently than when operating in the default mode.

2. The computing device of claim 1, wherein the network system manages a network-based service over a geographical region.

3. The computing device of claim 2, wherein the computing device further comprises:
a service application associated with the network-based service, wherein opening the service application initiates the default mode.

4. The computing device of claim 1, wherein the power status of the computing device indicates one or more of: (i) whether the computing device is operatively coupled to an external power source, or (ii) whether a remaining battery life of the computing device is below a threshold level.

5. The computing device of claim 1, wherein the connectivity metric of the network connection is at least one of: (i) latency, (ii) data bandwidth or throughput, or (iii) packet loss.

6. The computing device of claim 1, wherein determining whether to operate in the alternate power mode occurs in response to detecting a change in the power status.

7. The computing device of claim 1, wherein a data transmission rate for the alternate power mode is dynamically determined in response to determining to operate in the alternate power mode.

8. The computing device of claim 1, wherein a first data transmission rate for the default mode and a second data transmission rate for the alternate power mode are predefined.

9. The computing device of claim 1, wherein whether to operate in the alternate power mode is further based on at least one of: (i) a status of a service provider, (ii) a status of a requesting user, (iii) an estimated time of arrival to a service location, or (iv) an estimated time of arrival to a destination location.

10. The computing device of claim 1, wherein whether to operate in the alternate power mode is further based on at least one of: (i) a service type of a service provider, or (ii) signal strength information for the computing device.

11. The computing device of claim 1, wherein whether to operate in the alternate power mode is further based on at least one of: (i) a battery usage history of the computing device, (ii) a speed or an acceleration of the computing device, or (iii) a type of network connection for the computing device.

12. The computing device of claim 1, wherein whether to operate in the alternate power mode is further based on at least one of: (i) a device type of the computing device, (ii) or a device model of the computing device.

13. The computing device of claim 1, wherein, further in response to determining to operate in the alternate power mode, the location data is polled more frequently or less frequently by the computing device.

14. The computing device of claim 1, wherein the alternate power mode corresponds to at least one of: (i) a sleep mode, or (ii) a high-accuracy mode.

15. A computer-implemented method for transmitting location data of a computing device, the method comprising:
   operating in a default mode to periodically transmit the location data of the computing device to a network system;
   while operating in the default mode, determining, using a machine-learned model to perform a multi-variate analysis including weighting one or more parameters associated with transmitting the location data, the one or more parameters comprising at least (i) a power status of the computing device and (ii) a connectivity metric of a network connection, wherein the multi-variate analysis is specific to the computing device such that, when the multi-variate analysis is performed on a different computing device, at least one of the one or more weighted parameters for the computing device are different from at least one of the one or more weighted parameters for the different computing device, whether to operate in an alternate power mode to transmit the location data to the network system based, at least in part, on: (i) the power status of the computing device, and (ii) the connectivity metric of the network connection of the computing device; and
   in response to determining to operate in the alternate power mode, operating in the alternate power mode to periodically transmit the location data of the computing device to the network system more frequently or less frequently than when operating in the default mode.

16. The method of claim 15, wherein whether to operate in the alternate power mode is further based on the computing device detecting geolocation data of the computing device.

17. A non-transitory computer-readable medium storing instructions that, when executed by a processor of a computing device, cause the computing device to:
   operate in a default mode to periodically transmit location data of the computing device to a network system;
   while operating in the default mode, determine, using a machine-learned model to perform a multi-variate analysis including weighting one or more parameters associated with transmitting the location data, the one or more parameters comprising at least (i) a power status of the computing device and (ii) a connectivity metric of a network connection, wherein the multi-variate analysis is specific to the computing device such that, when the multi-variate analysis is performed on a different computing device, at least one of the one or more weighted parameters for the computing device are different from at least one of the one or more weighted parameters for the different computing device, whether to operate in an alternate power mode to transmit the location data to the network system based, at least in part, on: (i) the power status of the computing device, and (ii) the connectivity metric of the network connection of the computing device; and
   in response to determining to operate in the alternate power mode, operate in the alternate power mode to periodically transmit the location data of the computing device to the network system more frequently or less frequently than when operating in the default mode.

* * * * *